United States Patent
Zifroni et al.

(10) Patent No.: US 10,901,897 B2
(45) Date of Patent: Jan. 26, 2021

(54) METHOD AND APPARATUS FOR SEARCH ENGINE CACHE

(71) Applicant: MARVELL ISRAEL (M.I.S.L.) LTD., Yokneam (IL)

(72) Inventors: Dovrat Zifroni, Shoham (IL); Henri Sznajder, Kiryat Bialik (IL); Dmitry Lyachover, Holon (IL)

(73) Assignee: Marvell Israel (M.I.S.L.) Ltd., Yokneam (IL)

(*) Notice: Subject to any disclaimer, the term of this patent is extended or adjusted under 35 U.S.C. 154(b) by 4 days.

(21) Appl. No.: 16/248,390

(22) Filed: Jan. 15, 2019

(65) Prior Publication Data

US 2019/0220401 A1 Jul. 18, 2019

Related U.S. Application Data

(60) Provisional application No. 62/617,982, filed on Jan. 16, 2018.

(51) Int. Cl.
*G06F 12/08* (2016.01)
*G06F 12/0802* (2016.01)
*G06F 16/953* (2019.01)

(52) U.S. Cl.
CPC ........ *G06F 12/0802* (2013.01); *G06F 16/953* (2019.01); *G06F 2212/22* (2013.01)

(58) Field of Classification Search
CPC .. G06F 12/0802; G06F 12/122; G06F 16/953; G06F 16/90339; G06F 2212/22; G06F 45/74; G06F 45/7453; G06F 45/745; G06F 45/742
See application file for complete search history.

(56) References Cited

U.S. PATENT DOCUMENTS

| | | | |
|---|---|---|---|
| 9,507,731 B1 * | 11/2016 | Zheng | G06F 12/109 |
| 9,997,245 B1 | 6/2018 | Levy et al. | |
| 2012/0311267 A1 * | 12/2012 | Gaither | G06F 12/128 |
| | | | 711/122 |
| 2017/0046278 A1 * | 2/2017 | Clancy | G06F 12/123 |
| 2019/0036821 A1 * | 1/2019 | Levy | H04L 67/2842 |

* cited by examiner

*Primary Examiner* — Hiep T Nguyen

(57) ABSTRACT

Aspects of the disclosure provide a network device. The network device includes a search engine, a ternary content addressable memory (TCAM) cache engine, a search key generation unit and an output controller. The search engine stores a lookup table of entries for rules of packet processing, and searches the lookup table in response to packets received from a network interface of the network device. The TCAM cache engine caches a subset of the entries in the lookup table based on hit statistics of the entries. The search key generation unit generates a search key based on a received packet and provides the search key to the search engine and to the TCAM cache engine. The output controller outputs a search result from the TCAM cache engine when the TCAM cache engine has a matching entry to the search key.

18 Claims, 4 Drawing Sheets

METHOD AND APPARATUS FOR SEARCH ENGINE CACHE

INCORPORATION BY REFERENCE

This present disclosure claims the benefit of U.S. Provisional Application No. 62/617,982, "SEARCH ENGINE—TCAM ENGINE SYSTEM OPTIMIZATION" filed on Jan. 16, 2018, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, content addressable memory (CAM) is used in various applications to provide a relatively fast searching capability in which a search key is compared in parallel against a plurality of entry lines in a memory to find a matching entry. In an example, a network device, such as a network switch, a router and the like includes a ternary CAM (TCAM) that stores a plurality of switching rules, and a switching rule is selected and applied to an incoming packet based on various attributes of the incoming packet. In some cases, the TCAM is set up so that packets with different attributes may match the same TCAM entry such that a same switching rule is applied to packets having different attributes. Although TCAM devices are preferred from some search operations, they are generally considered to be an expensive resource, especially because of a relatively high power demand compared to other types of search engines.

SUMMARY

Aspects of the disclosure provide a network device. The network device includes a search engine, a ternary content addressable memory (TCAM) cache engine, a search key generation unit and an output controller. The search engine stores a lookup table of entries for rules of packet processing, and searches the lookup table in response to packets received from a network interface of the network device. The TCAM cache engine caches a subset of the entries in the lookup table based on hit statistics of the entries. The search key generation unit generates a search key based on a received packet and provides the search key to the search engine and to the TCAM cache engine. The output controller outputs a first received search result from the TCAM cache engine and the search engine. The first received search result indicates a matching entry to the search key.

For example, the output controller is configured to output the first received search result from the TCAM cache engine without waiting for a second search result from the search engine.

According to an aspect of the disclosure, the network device includes a maintenance controller configured to selectively mirror the subset of the entries from the search engine to the TCAM cache engine based on the hit statistics. In some embodiments, the output controller outputs a second search result from the search engine when the TCAM cache engine has no matching entry to the search key. The maintenance controller is configured to selectively mirror a specific entry corresponding to the second search result from the search engine to the TCAM cache engine.

In some embodiments, the maintenance controller is configured to maintain an aging table with bits corresponding to the subset of the entries to track hit activities for the subset of the entries in the TCAM cache engine. In some examples, the maintenance controller is configured to selectively replace one of the subset of the entries in the TCAM cache engine with the specific entry corresponding to the second search result based on the aging table.

In an example, the maintenance controller assigns two bits to a TCAM entry, and sets one of two bits to binary one at the time of a replacement of the TCAM entry to disable the TCAM entry from a next replacement in order to avoid race condition. Further, the maintenance controller is configured to set bits corresponding to a matching TCAM entry in the aging table to binary one. Then, the maintenance controller resets bits in the aging table periodically.

In an embodiment, the search engine includes static random access memory (SRAM). In another embodiment, the search engine includes dynamic random-access memory (DRAM).

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide a search system architecture for an electronic device, such as a network device, that performs lookup operations. The search system architecture is optimized to improve lookup efficiency. The search system architecture includes multiple search engines having different performance attributes, such as a first search engine of high lookup speed and a second search engine of low cost memory and the like, and the high speed search engine is configured as a cache engine for other search engines. Specifically, in some embodiments, one of the search engines is a ternary content addressable memory (TCAM) based search engine, and is configured as a cache engine for the other search engines that are less costly and/or that have lower performance. The TCAM based search engine is referred to as TCAM cache engine and caches a subset of entries that are stored in the other search engines based on hit statistics (e.g., search rates, a number of searches, etc.) of the entries. For example, the subset of the entries cached in the TCAM cache engine is searched more frequently than other entries in the other search engines.

Generally, the TCAM cache engine is considered a high speed, high performance and relatively expensive search engine compared to other search engines. When the more frequently searched entries are stored in the TCAM cache engine, the TCAM cache engine is used for more frequently performed lookup operations, and thus the more frequent lookup operations can be performed with relatively high speed.

Figure 1:
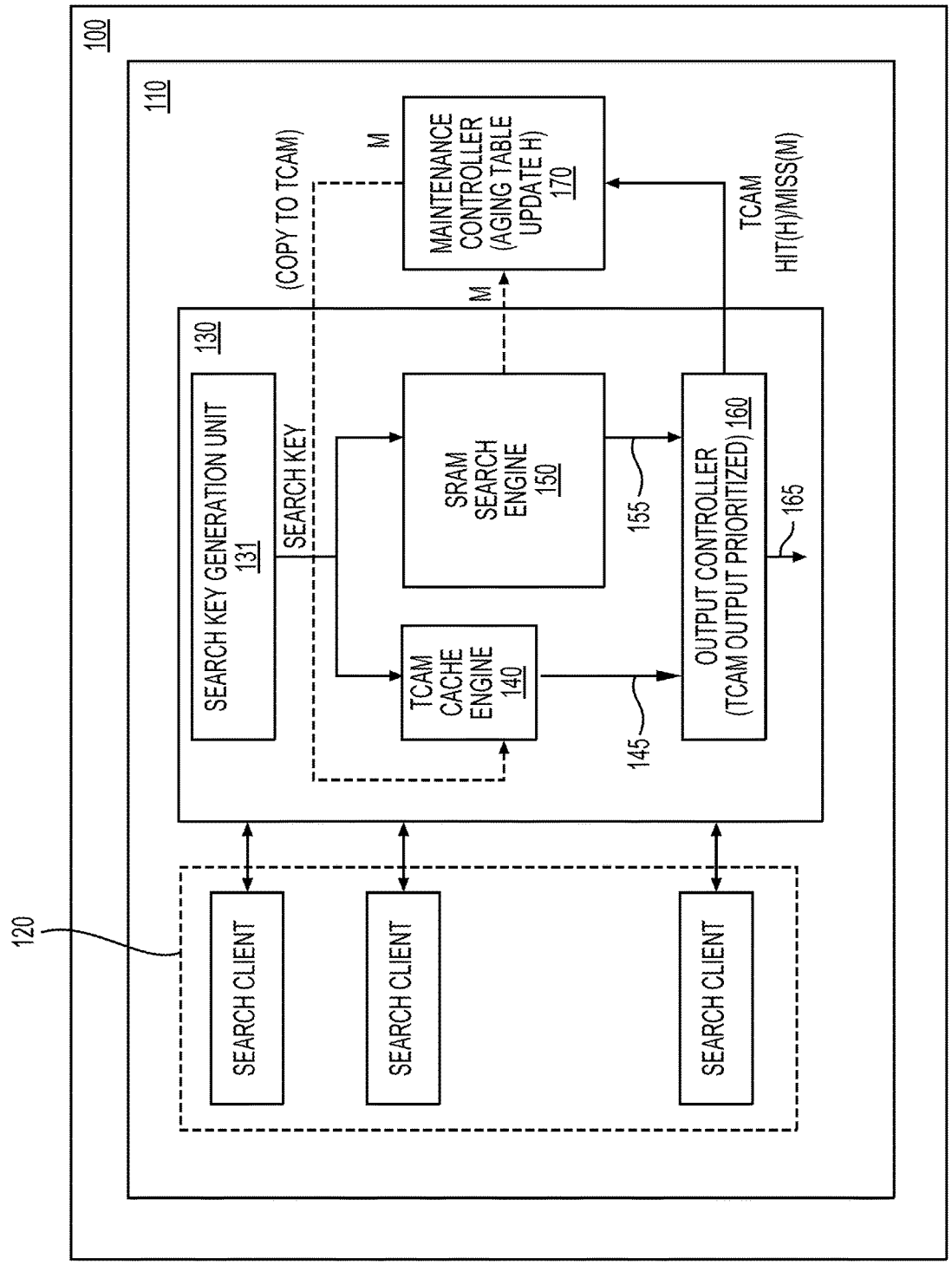
FIG. 1 shows a block diagram of an electronic device 100 according to an embodiment of the disclosure.

FIG. 1 shows a block diagram of an electronic device 100, such as a network device like a server, switch, router, storage adapter, or other suitable network device, according to an embodiment of the disclosure. The electronic device 100 includes a search system 130 configured to use a cache engine to improve lookup efficiency. Specifically, in the FIG. 1 example, the search system 130 includes a TCAM cache engine 140, and one or more search engines, such as a static random-access memory (SRAM) search engine 150 that may be searched using a suitable hash algorithm, and the like. The TCAM cache engine 140 is configured to cache a subset of entries that are stored in one or more other search engines, such as the SRAM search engine 150. The subset of the entries is selectively cached from the other search engines to the TCAM cache engine 140 based on hit statistics of the entries to cause the TCAM cache engine 140 to be populated with addresses having a higher probability for a hit in lookup operations.

It is noted that, in some embodiments, other suitable search engines, such as a dynamic random-access memory (DRAM) search engine (not shown), and the like can be used in the place of the SRAM search engine 150.

The electronic device 100 can be any suitable device, such as a network device, that uses a search engine to match a search key to stored data patterns (stored keys). In the FIG. 1 example, the electronic device 100 is a network device 100, such as a network switch, a router, and the like. The network device 100 includes packet processing engine 110 configured to process packets generated at the device, retrieved from a storage resource or received over a network coupling. For example, the network device 100 receives incoming packets from other devices via ingress ports, and the packet processing engine 110 processes the packets, and determines actions on the packets, such as forwarding a packet to one or more egress ports to output the packet, filtering a packet, statistics gathering for network management/security and the like based on attributes of the packets.

According to an aspect of the disclosure, the packet processing engine 110 determines actions to be performed on packets based on rules. In an embodiment, a rule includes criteria (that is stored as a key) and an action (that is stored as an action code) associated with the criteria. The criteria specify data patterns for attributes. In an example, some data patterns include a range requirement in which several different packets can match a stored entry and/or an exact match requirement. In an example, a switching rule is expressed in plain English as "permit forwarding a packet with source address 172.15.5.0/24, TCP port number between 1 to 14". The switching rule includes a source address criterion, a protocol (TCP) criterion, a TCP port number criterion, and an action "forward to port n" in association with the criteria. When a received packet satisfies the criteria, an action associated with the criteria can be taken on the received packet.

In the FIG. 1 example, the packet processing engine 110 includes a processing circuit 120 and the search system 130 coupled together. In an embodiment, the processing circuit 120 includes a plurality of search clients that require a search service from the search system 130. In an example, the search clients are packet processing stages, and one or more packet processing stages are coupled with the search system 130 to determine an action code for a packet.

In an example, a packet includes a header of 128 bytes. The packet processing stages respectively parse a portion of the header. Then, the search system 130 respectively searches for action codes based on the parsed portions of the header. The search results can be suitably combined to determine a suitable action code for the packet.

According to an aspect of the disclosure, criteria and associated actions are suitably stored in the search system 130, for example in the SRAM search engine 150 and the TCAM cache engine 140. The search system 130 includes other suitable components, such as a search key generation unit 131, an output controller 160 that are coupled with the SRAM search engine 150 and the TCAM cache engine 140 as shown in FIG. 1.

In an example, the search key generation unit 131 generates a search key based on attributes of a packet. In an example, the search key is generated by parsing the packet header and extracting selected data from fields of the header and/or by incorporating other data associated with the packet such as a port on which the packet was received. The search key is provided to both the TCAM cache engine 140 and the SRAM search engine 150 to perform lookup operations.

In some embodiments, the TCAM cache engine 140 includes TCAM blocks to store keys for the criteria and includes a small portion of regular memory blocks, such as SRAM blocks, DRAM blocks and the like to store action codes for the actions. In an embodiment, the keys are stored in entries that are indexed and the action codes are stored at addresses that are pointed to by indexes of the entries.

In an example, a TCAM block includes a plurality of TCAM entries that are respectively used to store keys. A TCAM entry includes a plurality of TCAM cells that each of which is configured to store ternary states, and thus each TCAM entry is able to store a range requirement representable in a ternary form that aligns with a binary form. For example, the value [16, 31] is represented in the binary aligned form as "01XXXX", where "X" represents a mask that matches both binary "0" and binary "1". Thus, [16, 31] is storable in a single entry of the TCAM cache engine 140. In another example, [32, 32] is an exact match requirement, and is also representable in the binary aligned form as "100000", thus [32, 32] is storable in a single entry of the TCAM cache engine 140. In another example, [16, 32] is expandable as a combination of [16, 31] and [32, 32] that are represented in the binary aligned form as "01XXXX" and "100000", thus the TCAM cache engine 140 needs to use two entries to store [16, 32].

During a lookup operation, in an example, when a search key is provided to the TCAM cache engine 140, the search key is compared with the TCAM entries in the TCAM cache engine 140 simultaneously to find a matching entry (also referred to as TCAM hit entry) that matches the search key. The address of the matching entry points to a memory space that stores an action code, and the TCAM cache engine 140 outputs the search result (shown as an output signal 145), such as the action code, and the like. It is noted that, in an example, when the TCAM cache engine 140 fails to find a matching entry, the TCAM cache engine 140 outputs a code (in the output signal 145) that is indicative of a TCAM miss.

In some embodiments, the TCAM cache engine 140 stores a default entry that matches any search key, and the default entry points to a specific code. The default entry has the lowest priority. When the TCAM cache engine 140 has a matching entry other than the default entry, the action code associated with the matching entry is output, and when the TCAM cache engine 140 has no other matching entry, the specific code associated with the default entry is output. Thus, when the output signal 145 includes the specific code, the TCAM cache engine 140 has a TCAM miss.

In some embodiments, the SRAM search engine 150 is configured to store rules in the form of a hash based lookup table. For example, the hash based lookup table stores entries of rules. For example, each entry stores a key in a compressed version, an action code associated with the key, and other suitable information, such as a valid flag, a match flag and the like. The entry is accessed through a hash operation on the key that, for instance, points to an address location where the entry is stored. In other words, the key is hashed to generate a hash code, and the hash code points to a memory space that stores the entry, such as the compressed key with the action code and other suitable information.

In some examples, the SRAM search engine 150 stores rules in the exact match form, and is referred to as exact match engine. For example, a range requirement is expanded into a combination of a plurality of exact match requirements, and the plurality of exact match requirements can be stored in a plurality of entries. For example, [16, 31] is stored in the SRAM search engine 150 using 16 entries that each stores a value in the range, and [32, 32] is stored in the SRAM search engine 140 using one entry.

During a lookup operation, in an example, when a search key is provided to the SRAM search engine 150, the search key is hashed to generate the hash code that points to a memory space of a potential matching entry with a compressed key and an action code. The compressed key is then uncompressed, and the uncompressed key is compared with the search key. When the uncompressed key matches the search key, the SRAM search engine 150 generates the search output (shown as an output signal 155), such as the action code in the potential matching entry.

According to an aspect of the disclosure, the SRAM search engine 150 is configured to store a complete set of rules, and a subset of the rules stored in the SRAM search engine 150 is selectively cached (or mirrored) into the TCAM cache engine 140. In the FIG. 1 example, the search key generation unit 131 provides the search key to both the TCAM cache engine 140 and the SRAM search engine 150 to concurrently perform lookup operations in both engines. Generally, the TCAM cache engine 140 has a higher lookup speed than other search engine, such as the SRAM search engine 150. Thus, when the TCAM cache engine 140 has a TCAM hit (e.g., meaning has a matching entry, other than the default entry, to the search key), the TCAM cache engine 140 outputs the action code much sooner than the SRAM search engine 150.

According to an aspect of the disclosure, the output controller 160 is configured to output a first received search result from the TCAM cache engine 140 and the SRAM search engine 150. In some embodiments, the TCAM cache engine 140 has a faster lookup speed than the SRAM search engine 150, and the output controller 160 is configured to prioritize the output signal 145 from the TCAM cache engine 140. For example, the output controller 160 is configured to operate based on the output signal 145. When the output signal 145 is indicative of a TCAM hit and includes an action code, the output controller 160 outputs the action code in an output signal 165 without waiting for the SRAM search engine 150 to generate the output signal 155. When the output signal 145 is indicative of a TCAM miss (e.g., the TCAM cache engine 140 has no matching entry, other than the default entry, to the search key), the output controller 160 waits for the SRAM search engine 150 to generate the output signal 155, and then outputs the output signal 165 based on the output signal 155. Thus, when the TCAM cache engine 140 has TCAM hits, the search system 130 generates the output signal 165 with fast speed.

According to an aspect of the disclosure, the TCAM cache engine 140 is configured to cache rules that are more frequently used to improve TCAM hit rate. In some embodiments, the rules that are stored in the SRAM search engine 150 are selectively cached into the TCAM cache engine 140 based on hit statistics of the rules.

In the FIG. 1 example, the packet processing engine 110 includes a maintenance controller 170 that is configured to collect the hit statistics of the rules stored in the SRAM search engine 150 and selectively cache a subset of the rules to the TCAM cache engine 140 based on the hit statistics. The maintenance controller 170 can be implemented using various techniques. In an example, the maintenance controller 170 is implemented as integrated circuits. In another example, the maintenance controller 170 is implemented as software instructions executed by a processor.

In some embodiments, the packet processing engine 110 includes multiple processors. Some processors can execute software instructions for packet processing, and operate as the search clients, and one of the processors can execute software instructions for maintenance and operates as the maintenance controller 170.

In an embodiment, the maintenance controller 170 is configured to cache a rule from the SRAM search engine 150 to the TCAM cache engine 140 when the TCAM cache engine 140 has a TCAM miss. In an example, when the search key generation unit 131 provides a specific search key to the TCAM cache engine 140 and the SRAM search engine 150 for a first time, the TCAM cache engine 140 has a TCAM miss to the specific search key, the output controller 160 waits for the SRAM search engine 150 to generate the output signal 155. The output signal 155 is indicative of a matching entry in the SRAM search engine 150 that matches the specific search key. For example, the output signal 155 includes an entry index of the matching entry in the SRAM search engine 150. The output controller 160 generates the output signal 165 based on the output signal 155 and also provides the matching entry information, such as the entry index in the SRAM search engine 150, to the maintenance controller 170. Then, the maintenance controller 170 copies the rule in the matching entry from the SRAM search engine 150 to the TCAM cache engine 140.

Thus, when the search key generation unit 131 provides the specific search key to the TCAM cache engine 140 and the SRAM search engine 150 for a second time, the TCAM cache engine 140 has a TCAM hit, and generates the output signal 145 having the action code, and the output controller 160 generates the output signal 165 based on the output signal 145. Thus, the search system 130 provides the search result for the specific search key with a faster speed in the second time than in the first time.

In an application scenario, the electronic device 100 is a network switch used in a network that has heavy traffic in packet flows. A packet flow is referred to as a sequence of packets of a same packet type originating from a same packet source (e.g., an application in a first endpoint device) and being sent to a same packet destination (e.g., an application in a second endpoint device).

When a new packet flow starts in the network, the electronic device 100 receives a sequence of packets in the packet flow and determines actions for the packets. In some embodiments, the search key generation unit 131 is configured to generate a same search key for packets in the same packet flow. Then, in response to the first packet in the packet flow, the search key generation unit 131 generates a search key of the packet flow for the first time and provides the search key to the TCAM cache engine 140 and the SRAM search engine 150 for the first time. The TCAM cache engine 140 has a TCAM miss to the search key, and the output controller 160 waits for the SRAM search engine 150 to generate the output signal 155. The SRAM search engine 150 determines a matching entry to the search key, and generates the output signal 155 that includes an entry index of the matching entry in the SRAM search engine 150 in an example. The output controller 160 generates the output signal 165 based on the output signal 155 and also provides the matching entry information, such as the entry index in the SRAM search engine 150, to the maintenance controller 170. Then, the maintenance controller 170 copies the rule in the matching entry from the SRAM search engine 150 to the TCAM cache engine 140.

Then, for the rest of the packet flow, the search key generation unit 131 generates the same search key in response to the rest of the packets in the packet flow, and provides the same search key to the TCAM cache engine 140 and the SRAM search engine 150. The TCAM cache engine 140 has TCAM hits in response to the same search key, and generates the output signal 145 having the action code, and the output controller 160 generates the output signal 165 based on the output signal 145. Thus, the search system 130 provides the search result for the rest of the packets in the packet flow with a faster speed than the first packet in the packet flow.

Further, according to an aspect of the disclosure, the TCAM cache engine 140 is configured to have a relatively small number of TCAM entries compared to the SRAM search engine 150 in order to save silicon space and reduce cost, and the maintenance controller 170 is configured to cache a new entry into the TCAM cache engine 140 using aging based entry replacement. In an example, the maintenance controller 170 is configured to maintain an aging table that tracks hit activities of TCAM entries. In some examples, the cached TCAM entries are associated with packet flows and thus the hit activities of the TCAM entries are indicative of activities of the packet flows that are associated with the TCAM entries. When a new flow starts, the maintenance controller 170 caches the key for the new flow into a TCAM entry with low or no hit activity.

Figure 2:
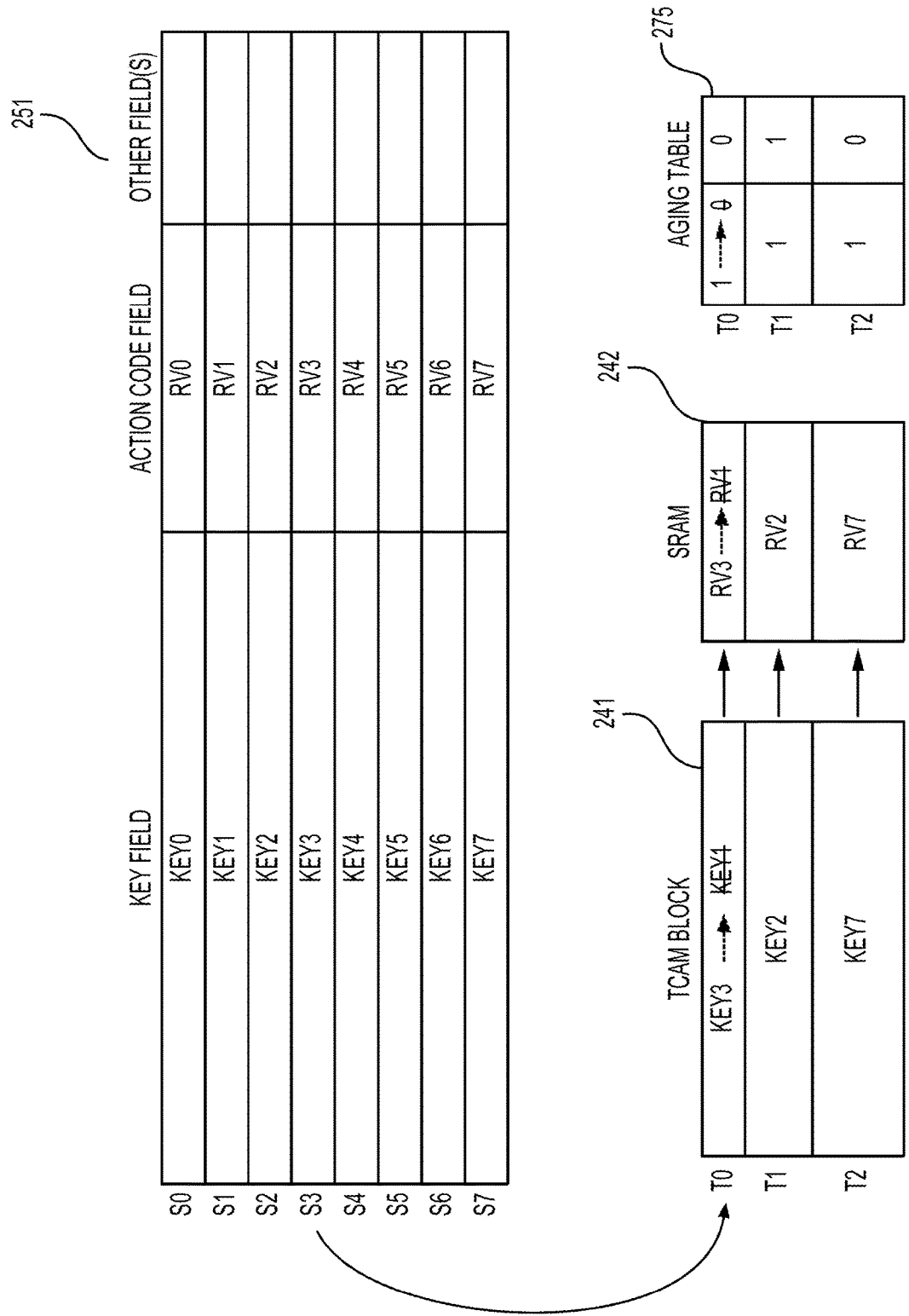
FIG. 2 shows an example to cache an entry from a search engine to a ternary content addressable memory (TCAM) cache engine in an electronic device, such as the electronic device 100, according to an embodiment of the disclosure.

FIG. 2 shows an example to cache a rule in an electronic device (e.g., the electronic device 100) from an SRAM search engine (e.g., the SRAM search engine 150) to a TCAM cache engine (e.g., the TCAM cache engine 140) according to an embodiment of the disclosure.

For example, the SRAM search engine 150 stores a lookup table 251 as shown in FIG. 2. The lookup table 251 includes a plurality of entries S0-S7, and each entry stores a key (or a compressed key), an action code associated with the key, and other suitable information. Further, the TCAM cache engine 140 stores a subset of keys in TCAM entries T0-T2 in a TCAM block 241, and the TCAM entries T0-T2 points to memory spaces in an SRAM block 242 that store action codes associated with the keys as shown in FIG. 2.

The maintenance controller 170 maintains an aging table 275 that tracks the hit activities of the TCAM entries T0-T2. In an example, the maintenance controller 170 is configured to reset bits corresponding to TCAM entries to binary zero periodically. When a TCAM entry in the TCAM cache engine 140 is a TCAM hit entry to a search key, the TCAM cache engine 140 generates the output signal 145. In an example, the output signal 145 is indicative of the entry index of the TCAM hit entry. The output controller 160 provides the entry index of the TCAM hit entry to the maintenance controller 170, and the maintenance controller 170 sets, in the aging table 275, bit(s) corresponding to the TCAM entry to binary 1.

Further, at a time to cache an entry (new entry) from the SRAM search engine 150 to the TCAM cache engine 140, the maintenance controller 170 selects a TCAM entry with low or no hit activities, for example with aging bit(s) being zero, and replaces the TCAM entry with the new entry.

In the FIG. 2 example, the maintenance controller 170 uses two bits to track hit activity for a TCAM entry to avoid race condition. For example, both bits for each of the TCAM entries are reset to zero periodically. When a TCAM entry has a hit, both bits are set to one. At the time to cache an entry (new entry for the TCAM cache engine 140) from the SRAM search engine 150 to the TCAM cache engine 140, the maintenance controller 170 selects a TCAM entry with both aging bits being zero to replace with the new entry, and then sets one of the two aging bits to one to avoid the race condition, in an embodiment.

Specifically, in the FIG. 2 example, at a time (e.g., when a first packet in a packet flow that needs to be handled according to the entry S3 is received), a search key KEY3 is generated and provided to both the SRAM search engine 150 and the TCAM cache engine 140. The TCAM cache engine 140 has a miss, and the entry S3 in the lookup table 251 matches the search key KEY3. The output controller 165 informs the maintenance controller 170 of TCAM miss, and also informs the index of the entry S3 to the maintenance controller 170. The maintenance controller 170 checks the aging table 275, and finds that the TCAM entry T0 has not had hit activity because both of the aging bits are zero. Thus, the maintenance controller 170 selects the TCAM entry T0 for replacement, and then the maintenance controller 170 copies the entry S3 from the SRAM search engine 150 into the TCAM cache engine 140. For example, the TCAM entry T0 is replaced with KEY3, and the memory space pointed to by the TCAM entry T0 is replaced with the action code associated with KEY3. The maintenance controller 170 then updates one of the two aging bits corresponding to the TCAM entry T0 from binary zero to binary 1.

Figure 3:
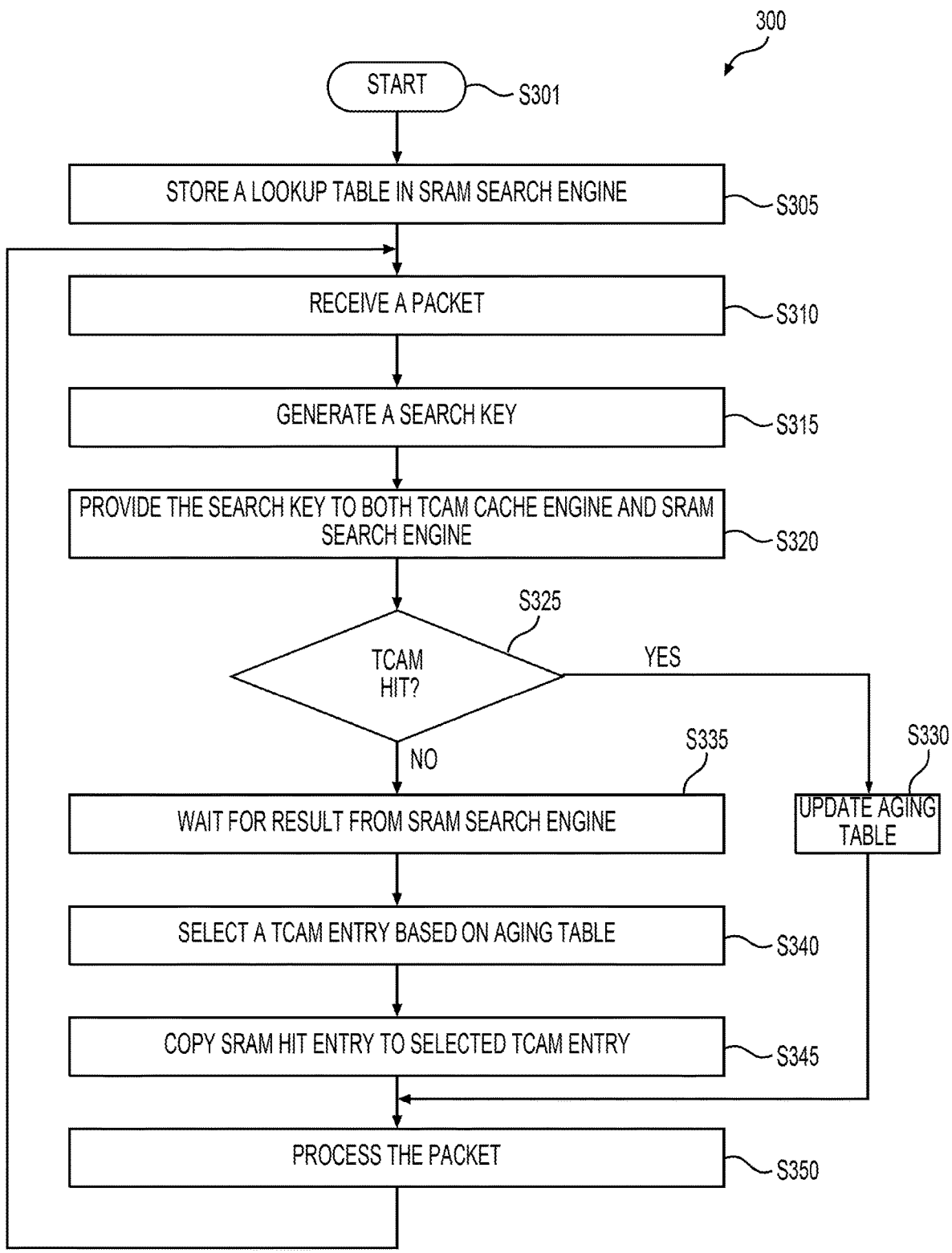
FIG. 3 shows a flow chart outlining a process 300 that is performed by an electronic device (e.g., the electronic device 100) according to an embodiment of the disclosure.

FIG. 3 shows a flow chart outlining a process 300 that is performed by an electronic device, for example, the electronic device 100 according to an embodiment of the disclosure. The process starts at S301 and proceeds to S305.

At S305, a lookup table is stored in the SRAM search engine 140. In an example, the lookup table stores rules to forward packets in packet flows. For example, a lookup entry of a rule to forward packets in a packet flow includes a key to identify packets belonging to the packet flow, and includes an action code of an action to be performed on the packets in the packet flow.

At S310, a packet is received by the electronic device 100. In an example, the packet is received from an ingress port of the electronic device 100, and is then processed by the processing circuit 120. For example, one of the search clients parses a portion of the header in the packet, and provides the header information to the search system 130.

At S315, a search key is generated. For example, the search key generation unit 131 generates a search key based on the header information provided by the search client.

At S320, the search key is provided to both the TCAM cache engine 140 and the SRAM search engine 150. The TCAM cache engine 140 and the SRAM search engine 150 respectively perform lookup operations based on the search key.

At S325, when the TCAM cache engine 140 has a TCAM hit (the TCAM cache engine 140 has a matching entry, other than the default entry, to the search key), the process proceeds to S330; otherwise, the process proceeds to S335. In an example, when the packet is a first packet in the packet flow, the TCAM cache engine 140 has a TCAM miss (the TCAM cache engine 140 has no matching entry, other than the default entry, to the search key); and when the packet is one of the subsequent packets in the packet flow, the TCAM cache engine 140 has a TCAM hit (the TCAM cache engine 140 has a matching entry, other than the default entry, to the search key).

At S330, the aging table is updated. In an example, when the TCAM cache engine 140 has a matching TCAM entry to the search key, the output controller 160 provides the index of the matching TCAM entry to the maintenance controller 170, and the maintenance controller 170 updates the aging table to indicate that the matching TCAM entry has hit activity. Then, the process proceeds to S350.

At S335, the output controller 160 receives the output signal 145 that is indicative of a TCAM miss, the output controller 160 waits for the SRAM search engine 150 to generate the output signal 155. When the SRAM search engine 150 finds a lookup entry with a key that matches the search key, the SRAM search engine 150 generates the output signal 155. In some examples, the output signal 155 includes the action code of the matching lookup entry and is indicative of the matching lookup entry (also referred to as SRAM hit entry), such as an index of the matching lookup entry. The output controller 160 provides the index of the matching lookup entry to the maintenance controller 170.

At S340, the maintenance controller 170 selects a TCAM entry for replacement based on the aging table. For example, the maintenance controller 170 selects a TCAM entry with no hit activity.

At S345, the maintenance controller 170 caches the matching lookup entry from the SRAM search engine 150 into the TCAM cache engine 140. For example, the maintenance controller 170 copies the key in the matching lookup entry into the selected TCAM entry, and copies the action code into a memory space that is pointed to by the selected TCAM entry.

At S350, the output controller 160 generates the output signal 165 with the action code, and the search client receives the action code and performs an action on the packet based on the action code. Then the process returns to S310 to receive a next packet.

It is noted that, in some examples, some steps in process 300 are performed by different components, thus the different components can perform the steps at the same time or in a different sequence from the process 300.

Figure 4:
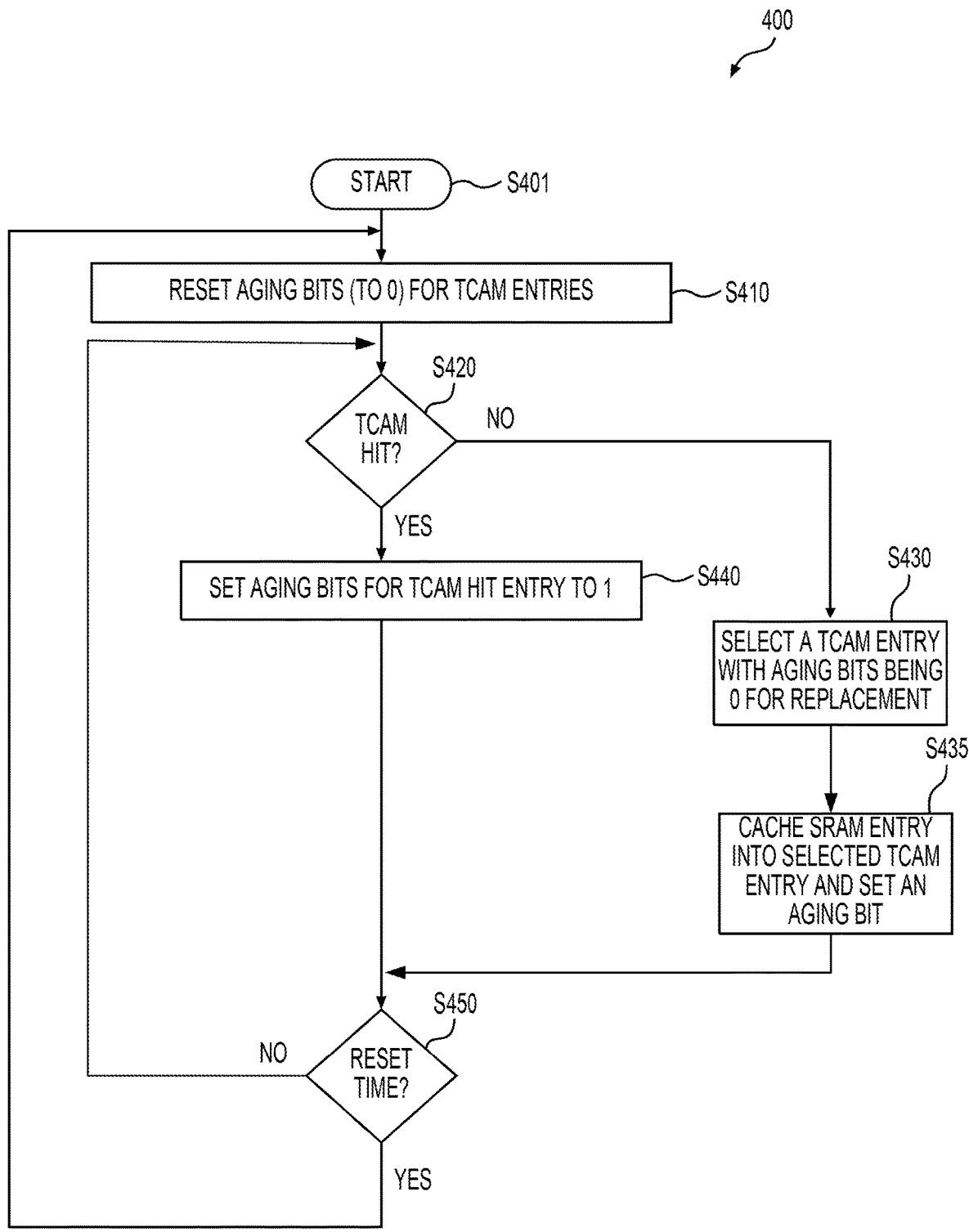
FIG. 4 shows a flow chart outlining a process 400 that is performed by a maintenance controller in an electronic device (e.g., the electronic device 100) according to an embodiment of the disclosure.

FIG. 4 shows a flow chart outlining a process 400 that is performed by a maintenance controller in an electronic device (e.g., the maintenance controller 170 in the electronic device 100) according to an embodiment of the disclosure. The process starts at S401 and proceeds to S410.

At S410, the maintenance controller 170 resets aging bits for TCAM entries periodically. In an example, the maintenance controller 170 maintains an aging table for the TCAM cache engine 140. For example, the maintenance controller 170 assigns two aging bits for each TCAM entry. It is noted that other suitable aging tracking techniques can be used.

At S420, the maintenance controller 170 receives TCAM hit/miss information from the output controller 165. In an example, each time the TCAM cache engine 140 has a TCAM hit, the output controller 160 provides a signal that is indicative of TCAM hit and the index of the TCAM hit entry to the maintenance controller 170. However, each time the TCAM cache engine 140 has a TCAM miss, the output controller 160 provides a signal that is indicative of TCAM miss to the maintenance controller 170; and then when the output controller 160 receives the SRAM hit information, the output controller 160 provides the SRAM hit information, such as the index of the SRAM hit entry to the maintenance controller 170. When the TCAM cache engine 140 has TCAM miss, the process proceeds to S430; otherwise, the process proceeds to S440.

At S430, the maintenance controller 170 selects a TCAM entry for replacement based on the aging table. For example, the maintenance controller 170 selects a TCAM entry with both of the two aging bits being zero.

At S435, the maintenance controller 170 copies the key in the matching lookup entry in the SRAM search engine 150 into the selected TCAM entry, and copies the action code into a memory space that is pointed by the selected TCAM entry. Further, in an example, the maintenance controller 170 sets one of the two aging bits of the selected TCAM entry to binary one to avoid race condition.

At S440, the TCAM cache engine 140 has a TCAM hit entry, and the maintenance controller 170 sets, for example both of the aging bits for the TCAM hit entry, to binary one.

At S450, before the periodic reset time, the process returns to S420 to check a next search result; and when periodic reset time comes, the process returns to S410 to reset the aging bits for TCAM entries.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A network device, comprising:
   a search engine configured to store a lookup table of entries for rules of packet processing, and to search the lookup table in response to packets received from a network interface of the network device;
   a ternary content addressable memory (TCAM) cache engine that is configured to be searched in parallel with the search engine, the TCAM cache engine being configured to cache a subset of the entries in the lookup table based on hit statistics of the entries;
   a search key generation unit configured to generate a search key based on a received packet and to separately provide the search key to the search engine and to the TCAM cache engine; and
   an output controller configured to output a first received search result from the TCAM cache engine without waiting for a second search result to be received from the search engine, the first received search result indicating a matching entry to the search key.

2. The network device of claim 1, further comprising:
   a maintenance controller configured to selectively mirror the subset of the entries from the search engine to the TCAM cache engine based on the hit statistics.

3. The network device of claim 2, wherein:
the output controller is configured to output the second search result from the search engine when the TCAM cache engine has no matching entry to the search key; and
the maintenance controller is configured to selectively mirror a specific entry corresponding to the second search result from the search engine to the TCAM cache engine.

4. The network device of claim 3, wherein:
the maintenance controller is configured to maintain an aging table with bits corresponding to the subset of the entries to track hit activities for the subset of the entries in the TCAM cache engine.

5. The network device of claim 4, wherein:
the maintenance controller is configured to select a TCAM entry and replace the TCAM entry with the specific entry corresponding to the second search result based on the aging table.

6. The network device of claim 5, wherein
the maintenance controller is configured to set one of two bits corresponding to the selected TCAM entry to binary one to disable the selected TCAM entry from a next immediate replacement.

7. The network device of claim 4, wherein:
the maintenance controller is configured to set bits corresponding to the matching entry in the aging table to binary one.

8. The network device of claim 4, wherein:
the maintenance controller is configured to reset bits in the aging table to binary zero periodically.

9. The network device of claim 1, wherein the search engine includes at least one of static random access memory (SRAM), and dynamic random-access memory (DRAM).

10. A method for lookup in a network device, comprising:
storing, by a search engine, a lookup table of a lookup table of entries of rules for packet processing;
caching, by a ternary content addressable memory (TCAM) cache engine configured to be searched in parallel with the search engine, a subset of the entries in the lookup table based on hit statistics of the entries;
separately providing a search key that is generated based on a received packet to the search engine and to the TCAM cache engine; and
outputting a first received search result from the TCAM cache engine without waiting for a second search result to be received from the search engine, the first received search result indicating a matching entry to the search key.

11. The method of claim 10, further comprising:
selectively mirroring the subset of the entries from the search engine to the TCAM cache engine based on the hit statistics.

12. The method of claim 11, further comprising:
outputting the second search result from the search engine when the TCAM cache engine has no matching entry to the search key;
selectively mirroring a specific entry corresponding to the second search result from the search engine to the TCAM cache engine.

13. The method of claim 12, further comprising:
maintaining an aging table with bits corresponding to the subset of the entries to track hit activities for the subset of the entries in the TCAM cache engine.

14. The method of claim 13, further comprising:
selecting a TCAM entry based on the aging table; and
replacing the selected TCAM entry with the specific entry corresponding to the second search result.

15. The method of claim 14, further comprising:
setting one of two bits corresponding to the selected TCAM entry to binary one to disable the selected TCAM entry from a next immediate replacement.

16. The et d of claim 13, further comprising:
setting bits corresponding to the matching entry in the aging table to binary one to track the hit activity of the matching ent y.

17. The method of claim 13, further comprising:
resetting bits in the aging table to zero periodically.

18. An electronic device, comprising:
a search engine configured to store a lookup table of entries for rules;
a ternary content addressable memory (TCAM) cache engine that is configured to be searched in parallel with the search engine, the TCAM cache engine being configured to cache a subset of the entries in the lookup table based on hit statistics of the entries;
a search key generation unit configured to generate a search key in response to a request from a search client and to separately provide the search key to the search engine and to the TCAM cache engine; and
an output controller configured to output a first received search result from the TCAM cache engine without waiting for a second search result to be received from the search engine, the first received search result indicating a matching entry to the search key.

* * * * *